United States Patent
Lee et al.

(10) Patent No.: US 11,687,128 B2
(45) Date of Patent: Jun. 27, 2023

(54) ELECTRONIC DEVICE INCLUDING FLEXIBLE DISPLAY AND ANTENNA

(71) Applicant: Samsung Electronics Co., Ltd., Suwon-si (KR)

(72) Inventors: Wonho Lee, Suwon-si (KR); Hoyoung Jeong, Suwon-si (KR); Hyoungtak Cho, Suwon-si (KR); Soyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/573,036

(22) Filed: Jan. 11, 2022

(65) Prior Publication Data

US 2022/0147116 A1    May 12, 2022

Related U.S. Application Data

(63) Continuation of application No. PCT/KR2021/016061, filed on Nov. 5, 2021.

(30) Foreign Application Priority Data

Nov. 6, 2020 (KR) .................. 10-2020-0147371
Mar. 4, 2021 (KR) .................. 10-2021-0028874

(51) Int. Cl.
*G06F 1/16* (2006.01)

(52) U.S. Cl.
CPC .......... *G06F 1/1698* (2013.01); *G06F 1/1624* (2013.01); *G06F 1/1652* (2013.01)

(58) Field of Classification Search
CPC .... G06F 1/1624; G06F 1/1652; G06F 1/1656; G06F 1/1698
See application file for complete search history.

(56) References Cited

U.S. PATENT DOCUMENTS 6,208,874 B1 * 3/2001 Rudisill .............. H04M 1/0237
                                                        455/575.4
6,752,320 B1 * 6/2004 Herranen .................. H01Q 1/22
                                                          343/702

(Continued)

FOREIGN PATENT DOCUMENTS

KR    10-2006-0068926 A    6/2006
KR       10-0606798 B1    8/2006

(Continued)

OTHER PUBLICATIONS

International Search Report dated Feb. 11, 2022, issued in International Application No. PCT/KR2021/016061.

*Primary Examiner* — Adrian S Wilson
(74) *Attorney, Agent, or Firm* — Jefferson IP Law, LLP

(57) ABSTRACT

An electronic device is provided. The electronic device includes a first housing, a second housing, a flexible display, a printed circuit board, an antenna radiator, and a flexible printed circuit board. The second housing slides in a first direction to be pulled out of the first housing and slides in a second direction opposite to the first direction to be pulled into the inside of the first housing. The flexible display is disposed in the first housing and the second housing. The printed circuit board is disposed in the second housing and may move according to sliding of the second housing. The antenna radiator is disposed on a side surface of the first housing. The flexible printed circuit board electrically connects the printed circuit board and the antenna radiator. The first housing includes a through hole formed in a side surface thereof, and at least a portion of the antenna radiator may be inserted via the through hole into the inside of the first housing. The antenna radiator may move on the side surface of the first housing according to sliding of the second housing.

20 Claims, 19 Drawing Sheets

(56) References Cited

U.S. PATENT DOCUMENTS

| | | | |
|---|---|---|---|
| 6,961,593 B1* | 11/2005 | Lonka | H01Q 1/243 |
| | | | 455/550.1 |
| 6,980,840 B2* | 12/2005 | Kim | H01Q 1/244 |
| | | | 455/575.8 |
| 7,106,260 B2* | 9/2006 | Ryu | H01Q 1/243 |
| | | | 343/702 |
| 7,262,737 B2* | 8/2007 | Zarnowitz | H01Q 1/088 |
| | | | 343/702 |
| 7,274,335 B2* | 9/2007 | Kim | H01Q 1/243 |
| | | | 343/702 |
| 7,321,336 B2* | 1/2008 | Phillips | H01Q 1/36 |
| | | | 343/702 |
| 7,463,202 B2* | 12/2008 | Zarnowitz | H01Q 1/088 |
| | | | 343/702 |
| 7,554,497 B2* | 6/2009 | Ohba | H01Q 21/29 |
| | | | 343/702 |
| 7,595,763 B2 | 9/2009 | Hershey et al. | |
| 7,884,770 B2* | 2/2011 | Yanagi | H01Q 1/273 |
| | | | 343/702 |
| 8,219,161 B2* | 7/2012 | Hiraoka | H01Q 9/14 |
| | | | 343/702 |
| 8,463,339 B2* | 6/2013 | Hiraoka | H01Q 1/1235 |
| | | | 343/702 |
| 11,050,452 B2 | 6/2021 | Horiuchi | H04B 1/385 |
| 11,184,987 B1* | 11/2021 | Jung | H04B 1/0053 |
| 2002/0137476 A1* | 9/2002 | Shin | H04M 1/0237 |
| | | | 455/575.4 |
| 2004/0219956 A1 | 11/2004 | Iwai et al. | |
| 2006/0097929 A1* | 5/2006 | Chung | H01Q 1/38 |
| | | | 343/702 |
| 2006/0097933 A1 | 5/2006 | Lee | |
| 2006/0132366 A1 | 6/2006 | Seol et al. | |
| 2006/0145932 A1* | 7/2006 | Lim | H01Q 9/0421 |
| | | | 343/702 |
| 2007/0270180 A1* | 11/2007 | Takagi | H04M 1/0237 |
| | | | 455/550.1 |
| 2009/0066585 A1* | 3/2009 | Sato | H01Q 1/243 |
| | | | 343/702 |
| 2019/0261519 A1* | 8/2019 | Park | G06F 3/04886 |
| 2021/0135492 A1* | 5/2021 | Kim | H02J 50/10 |
| 2021/0144240 A1 | 5/2021 | Lee et al. | |
| 2021/0219437 A1 | 7/2021 | Kim et al. | |
| 2022/0019261 A1* | 1/2022 | Kang | H04M 1/0268 |
| 2022/0053653 A1* | 2/2022 | Jung | H04M 1/0237 |

FOREIGN PATENT DOCUMENTS

| | | |
|---|---|---|
| KR | 10-2007-0010985 A | 1/2007 |
| KR | 10-0677385 B1 | 2/2007 |
| KR | 10-0703317 B1 | 4/2007 |
| KR | 10-2009-0131859 A | 12/2009 |
| KR | 10-0995418 B1 | 11/2010 |
| KR | 10-1050634 B1 | 7/2011 |
| KR | 10-2019-0101184 A | 8/2019 |
| KR | 10-2019-0105101 A | 9/2019 |
| KR | 10-2019-0143029 A | 12/2019 |
| KR | 10-2022-0030803 A | 3/2022 |
| KR | 10-2022-0039390 A | 3/2022 |

* cited by examiner

<SCREEN CONTRACTION STATE>

<SCREEN EXPANSION STATE>

ELECTRONIC DEVICE INCLUDING FLEXIBLE DISPLAY AND ANTENNA

CROSS-REFERENCE TO RELATED APPLICATION(S)

This application is a continuation application, claiming priority under § 365(c), of an International application No. PCT/KR2021/016061, filed on Nov. 5, 2021, which is based on and claims the benefit of a Korean patent application number 10-2020-0147371, filed on Nov. 6, 2020, in the Korean Intellectual Property Office, and of a Korean patent application number 10-2021-0028874, filed on Mar. 4, 2021, in the Korean Intellectual Property Office, the disclosure of each of which is incorporated by reference herein in its entirety.

TECHNICAL FIELD

The disclosure relates to an electronic device including a flexible display and an antenna.

BACKGROUND ART

With the development of display technology, research and development of electronic devices having a flexible display (or rollable display) are being actively conducted. The shapes of electronic devices are being transformed from uniform rectangular shapes to a variety of shapes. For example, by applying the flexible display, electronic devices are being researched and developed to have a form factor capable of folding, bending, rolling, or unfolding the flexible display.

The above information is presented as background information only to assist with an understanding of the disclosure. No determination has been made, and no assertion is made, as to whether any of the above might be applicable as prior art with regard to the disclosure.

DISCLOSURE

Technical Problem

According to the screen expansion or screen contraction of the electronic device including a flexible display, the antenna radiation efficiency may be reduced as the length of the flexible printed circuit board electrically connected to the antenna is changed, and a space for folding and unfolding the flexible printed circuit board may be required.

In various embodiments of the disclosure, the position of the radiator included in the antenna of an electronic device including a flexible display may be moved according to the screen expansion and screen contraction of the flexible display shown to the outside.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first housing, a second housing, a flexible display, a printed circuit board, an antenna radiator, and a flexible printed circuit board. The second housing slides in a first direction to be pulled out of the first housing and slides in a second direction opposite to the first direction to be pulled into the inside of the first housing. The flexible display is disposed in the first housing and the second housing. The printed circuit board is disposed in the second housing and moves according to the sliding of the second housing. The antenna radiator is disposed on a side surface of the first housing. The flexible printed circuit board electrically connects the printed circuit board and the antenna radiator. The first housing includes a through hole formed in a side surface thereof, and at least a portion of the antenna radiator may be inserted via the through hole into the inside of the first housing. The antenna radiator moves on the side surface of the first housing according to sliding of the second housing.

Advantageous Effects

In an electronic device according to an embodiment of the disclosure, when the screen of a flexible display shown to the outside is expanded or contracted, the antenna and the flexible printed circuit board may be moved together with the sliding of the housing, thereby reducing loss due to an increase in the length of the flexible printed circuit board and improving the radiation performance of the antenna accordingly.

In the electronic device according to an embodiment of the disclosure, a conductive member used as the radiator of the antenna may be disposed on the outer sidewall of the housing, and the conductive member may be covered through a decoration portion to prevent the radiator of the antenna from being exposed to the outside. The radiator of the antenna may be disposed outside the housing of the electronic device through a through hole 225, thereby securing a space of the electronic device and securing the degree of freedom in the design of the electronic device.

In the electronic device according to various embodiments of the disclosure, according to the expansion of the flexible display shown to the outside and screen contraction, the antenna is moved at the outer side of the housing of the electronic device and the flexible printed circuit board electrically connected to the antenna is moved inside the housing, so that a space for folding and unfolding the flexible printed circuit board is not required and an internal space of the electronic device can be secured accordingly.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

Figure 1:
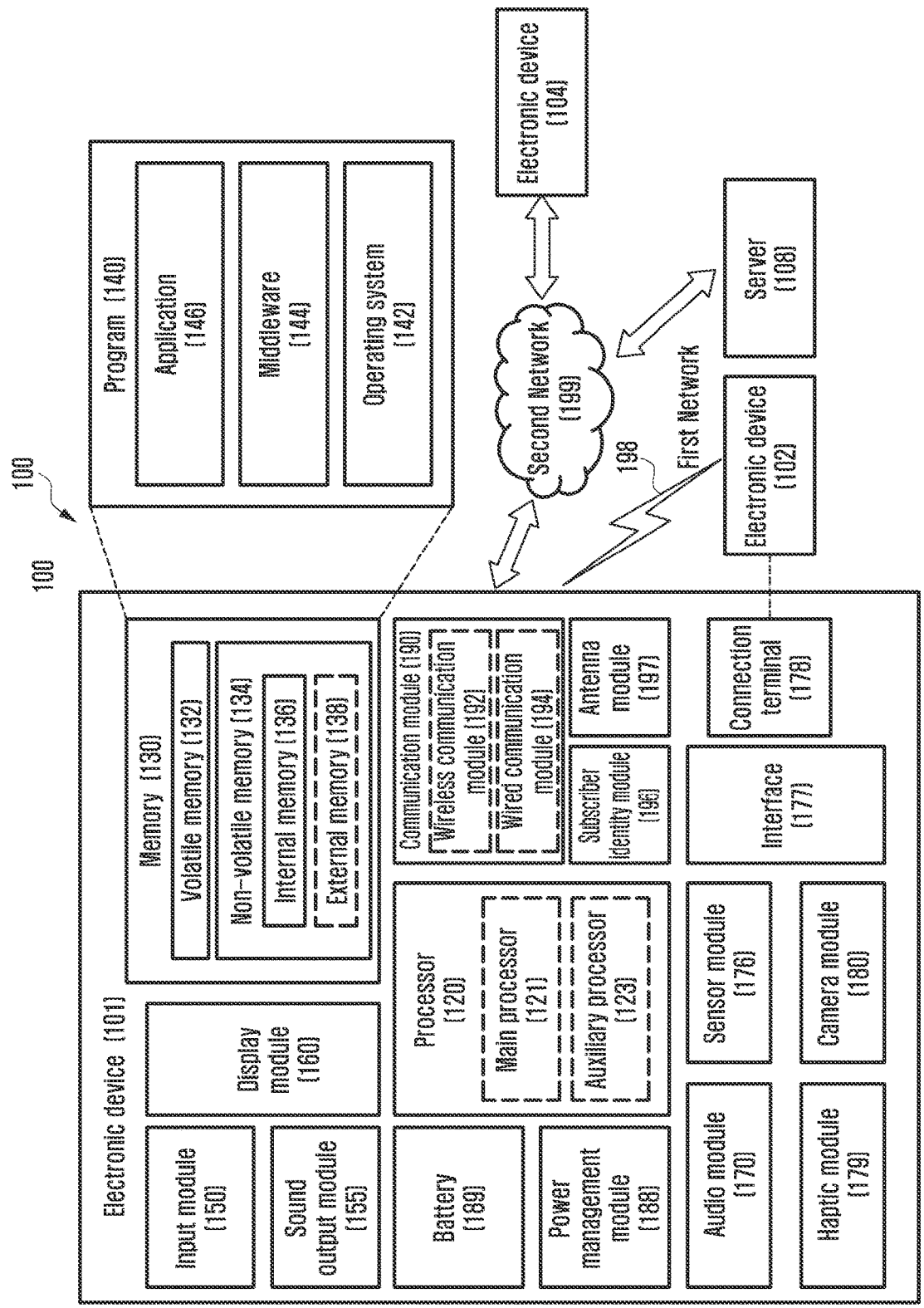
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
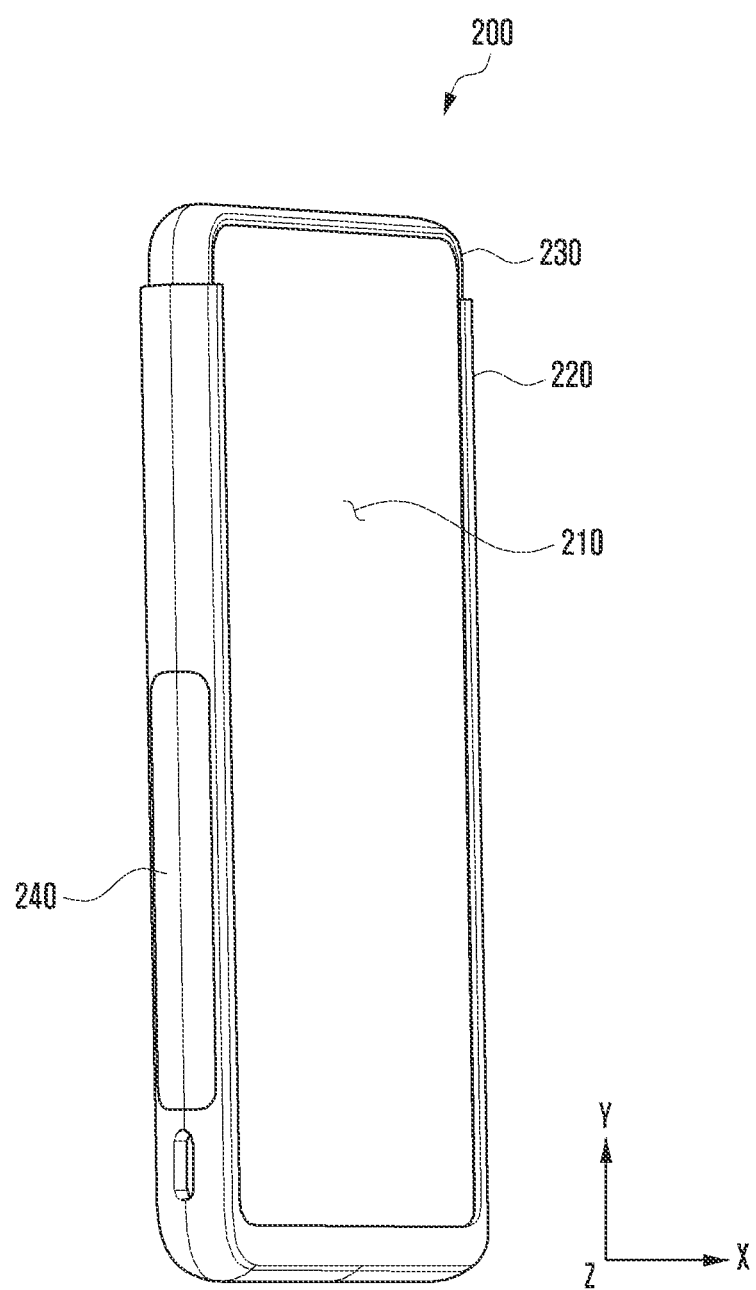
FIG. 2 is a view illustrating an electronic device in a slide-in (e.g., slide-close) state according to an embodiment of the disclosure.
Figure 3:
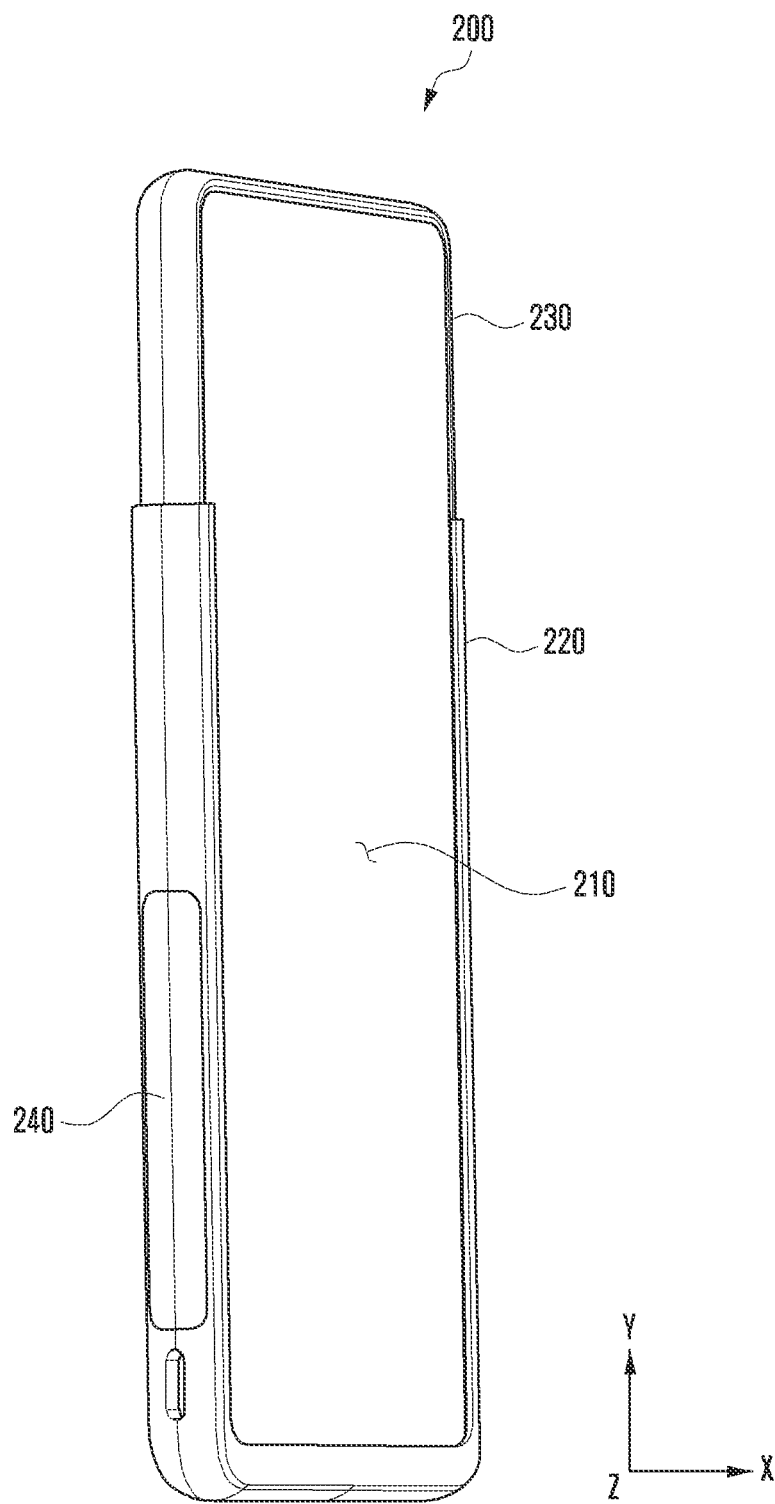
FIG. 3 is a view illustrating the electronic device in a screen slide-out (e.g., slide-open) state according to an embodiment of the disclosure.

FIG. 2 is a view illustrating an electronic device in a slide-in (e.g., slide-close) state according to an embodiment of the disclosure. FIG. 3 is a view illustrating the electronic device in a slide-out (e.g., slide-open) state according to an embodiment of the disclosure. FIGS. 2 and 3 illustrate the electronic device 200 viewed from the front.

Referring to FIGS. 2 and 3, the screen may mean an externally visible area of the display 210 (e.g., flexible display). As used herein, slide-in (e.g., slide-close) of the display 210 may indicate a state in which the size of the screen of the display 210 seen from the outside is reduced. Slide-out (e.g., slide-open) of the display 210 may indicate a state in which the size of the screen of the display 210 seen from the outside is expanded.

Figure 4:
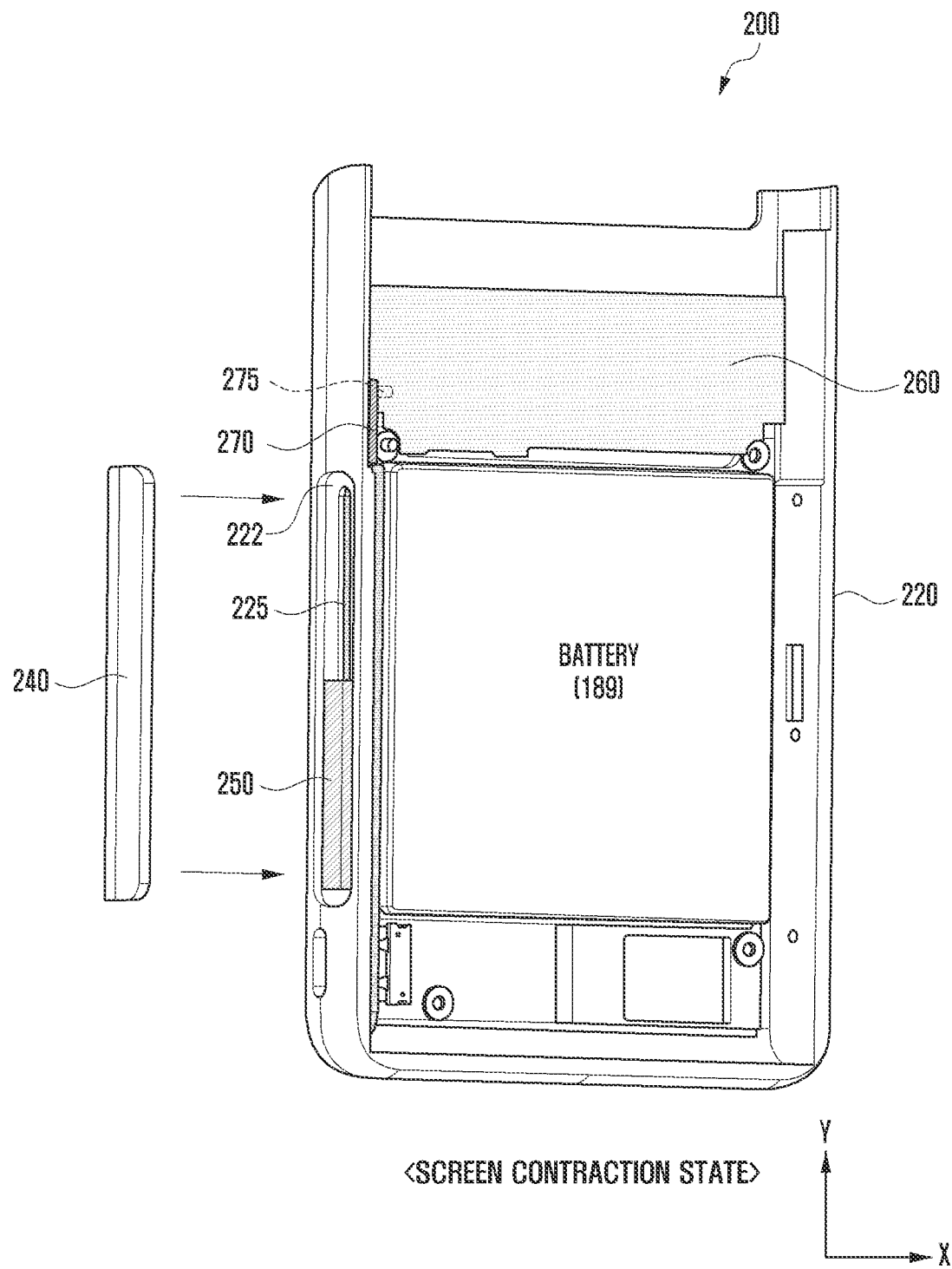
FIG. 4 is a view illustrating the position of an antenna radiator of the electronic device in a slide-in (e.g., slide-close) state according to an embodiment of the disclosure.

Referring to FIGS. 2 and 3, the electronic device 200 according to an embodiment of the disclosure may include a display 210 (e.g., display module 160 in FIG. 1), housings 220 and 230, a decoration portion 240, an antenna (e.g., antenna radiator 250 in FIG. 4), a printed circuit board (PCB) (e.g., printed circuit board 260 in FIG. 4), a flexible printed circuit board (FPCB) (e.g., flexible printed circuit board 270 in FIG. 4), and/or a battery (e.g., battery 189 in FIG. 4).

The housings 220 and 230 may include a first housing 220 (e.g., main housing) and a second housing 230 (e.g., slide housing). For example, at least some of the second housing 230 may be inserted into the first housing 220.

A space may be provided inside the housings 220 and 230, and at least some of the display 210 (e.g., display module 160 in FIG. 1) may be disposed in the internal space of the housings 220 and 230.

Various components (e.g., antenna radiator 250, printed circuit board 260, flexible printed circuit board 270, audio module (e.g., audio module 170 in FIG. 1), sensor module (e.g., sensor module 176 in FIG. 1), camera module (e.g., camera module 180 in FIG. 1), and/or battery 189) of the electronic device 200 may be arranged in the internal space of the housings 220 and 230.

The display may be a flexible or rollable display, and may be disposed so that a portion of the display is bent or wound in the internal space of the housings 220 and 230. The display may be pulled out or pulled in in association with the rotation of a rotation shaft disposed on one side of the internal space of the housings 220 and 230. For example, the rotation shaft may rotate in association with sliding of the second housing 230.

When the electronic device 200 is in a slide-out (e.g., slide-open) state, the second housing 230 may be moved (e.g., sliding) in a first direction (e.g., Y-axis direction) and at least a portion of the second housing 230 may be pulled out of the first housing 220. When the second housing 230 is moved (e.g., sliding) in the first direction (e.g., Y-axis direction), the display 210 (e.g., display module 160 in FIG. 1) may be pulled out (e.g., screen expansion sliding) in the first direction (e.g., Y-axis direction), so that the area of the display viewed from the outside may be expanded. For example, the size (e.g., area) of the display 210 viewed from the outside may be expanded (e.g., screen expansion).

When the electronic device 200 is in a slide-in (e.g., slide-close) state, the second housing 230 may be moved (e.g., sliding) in a second direction (e.g., negative Y-axis direction) and some of the second housing 230 may be pulled into the first housing 220. When the second housing 230 is moved (e.g., sliding) in the second direction (e.g., negative Y-axis direction), the display 210 (e.g., display module 160 in FIG. 1) may be pulled in (e.g., screen contraction sliding) in the second direction (e.g., negative Y-axis direction), so that the area of the display viewed from the outside may be reduced. The size (e.g., area) of the display 210 viewed from the outside may thus be reduced (e.g., screen contraction).

Figure 5:
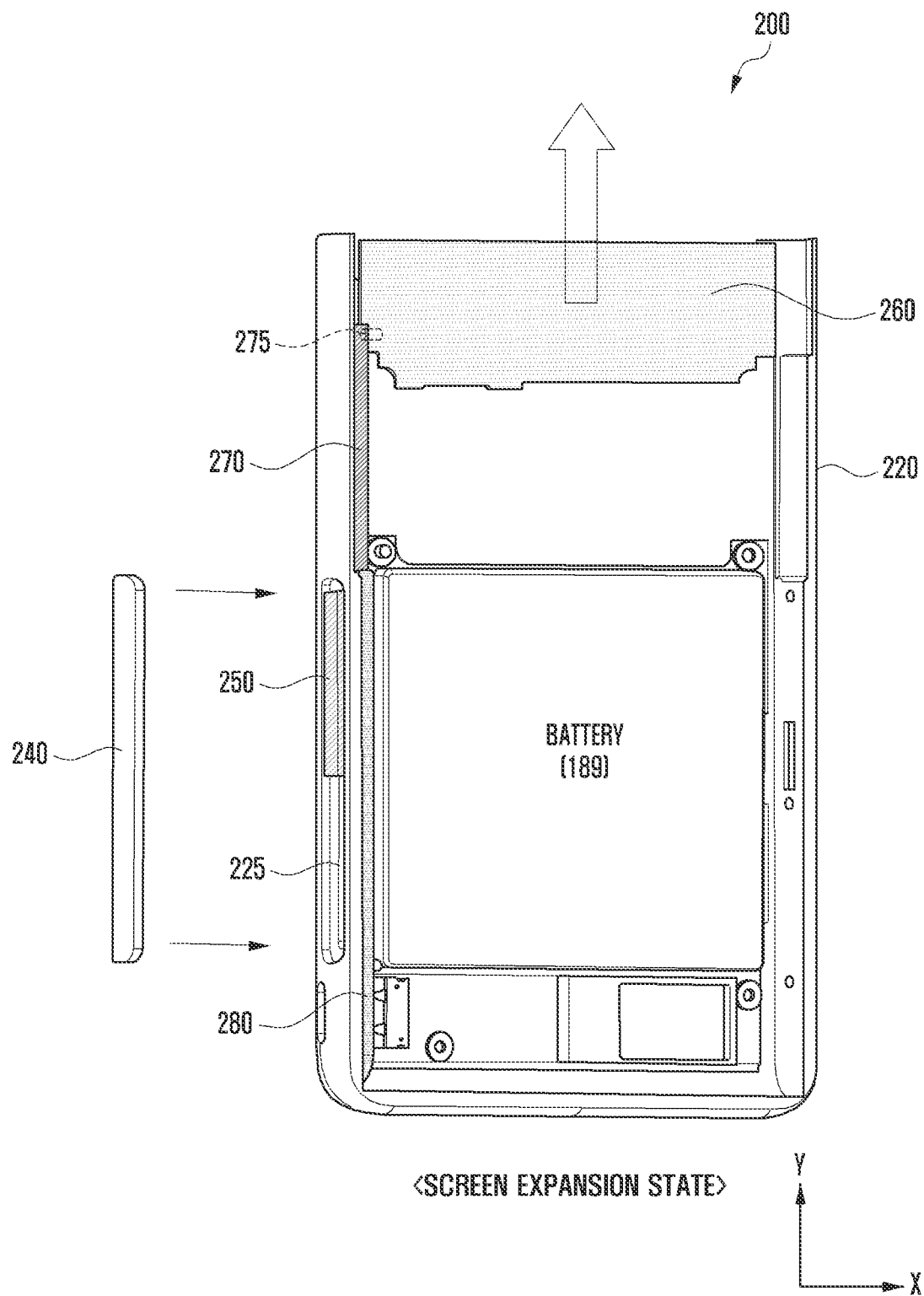
FIG. 5 is a view illustrating the position of the antenna radiator of the electronic device in a slide-out (e.g., slide-open) state according to an embodiment of the disclosure.

FIG. 4 is a view illustrating the position of an antenna radiator of the electronic device in a slide-in (e.g., slide-close) state according to an embodiment of the disclosure. FIG. 5 is a view illustrating the position of the antenna radiator of the electronic device in a slide-out (e.g., slide-open) state according to an embodiment of the disclosure.

Referring to FIGS. 4 and 5, a battery 189 may be disposed in the internal space of the first housing 220. A printed circuit board 260 may be disposed in the internal space of the second housing 230.

According to an embodiment of the disclosure, the antenna radiator 250 may be disposed on a sidewall of one side (e.g., negative X-axis) of the first housing 220. The antenna radiator 250 may be made of a conductive metal material in a bar shape. The first housing 220 may include a non-conductive material. For example, the region of the first housing 220 in which the antenna radiator 250 is disposed may be made of a non-conductive material.

Figure 6:
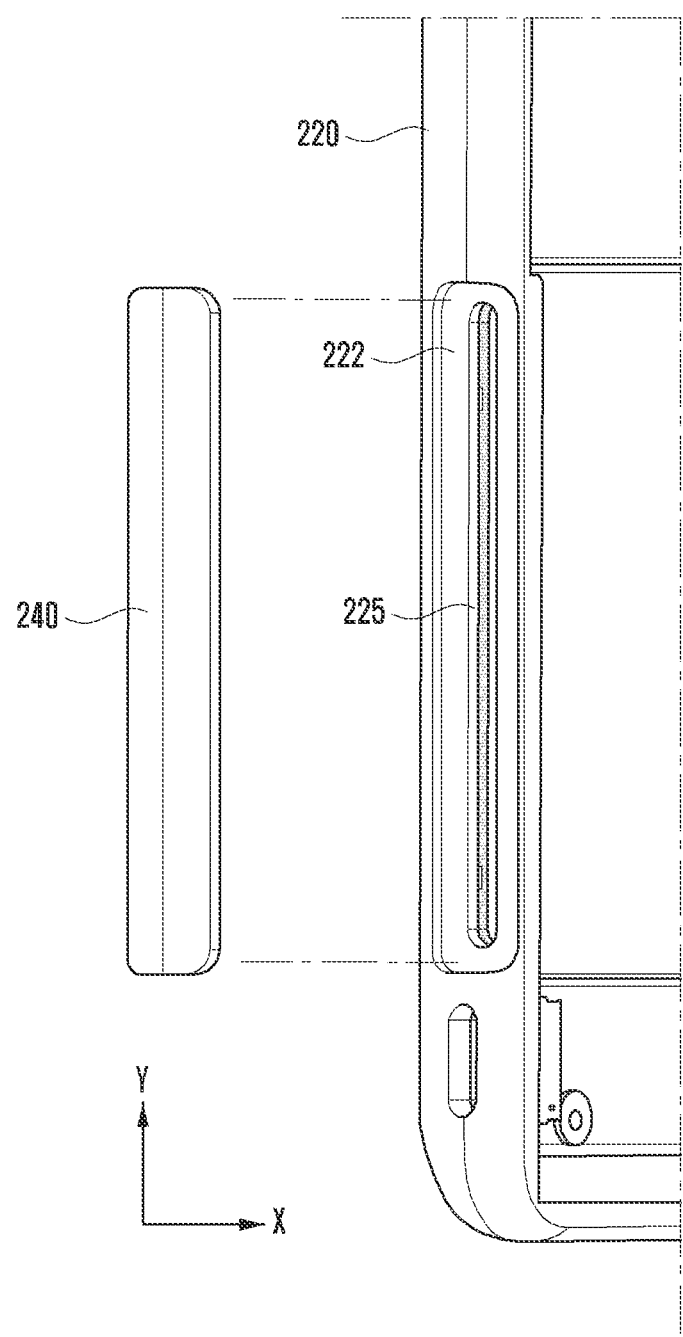
FIG. 6 is a view showing a slit formed in a side portion of the first housing so that the antenna radiator can move according to slide-in (e.g., slide-close) or slide-out (e.g., slide-open) of the display, according to an embodiment of the disclosure.

FIG. 6 is a view illustrating a recess and a through hole formed in a side portion of the first housing so that the antenna radiator can be moved according to slide-in (e.g., slide-close) or slide-out (e.g., slide-open) of the display according to an embodiment of the disclosure.

Referring to FIGS. 4 to 6, a recess 222 having a preset depth may be formed on a sidewall of one side (e.g., negative X-axis) of the first housing 220 so that the antenna radiator 250 can be disposed, and a through hole 225 penetrating the sidewall of one side (e.g., negative X-axis) of the first housing 220 may be formed. For example, the through hole 225 may be formed to have a first length in the X-axis direction and a second length in the Y-axis direction.

The antenna radiator 250 may be disposed in the recess 222 formed to have a preset depth. The through hole 225 may be formed in a shape penetrating the sidewall of one side (e.g., negative X-axis) of the first housing 220 so that at least a portion of the antenna radiator 250 is electrically connectable to a component arranged inside the first housing 220.

According to an embodiment of the disclosure, the recess 222 may be formed in one sidewall of the first housing 220. For example, the recess 222 may be formed to have a length corresponding to the length to which the antenna radiator 250 moves. As another example, the recess 222 may be formed to a depth such that, when the antenna radiator 250 is disposed, the antenna radiator 250 does not protrude in the negative X-axis direction from the sidewall on which the recess 222 is formed.

The through hole 225 may be formed in the shape of a bar having a long length in the Y-axis direction, the antenna radiator 250 may be disposed in the recess 222, and the antenna radiator 250 may be moved in a first direction (e.g., upward direction, Y-axis direction) or in a second direction (e.g., downward direction, negative Y-axis direction) (e.g., up/down direction) via the through hole 225 penetrating the sidewall of one side (e.g., negative X-axis) of the first housing 220.

For smooth movement of the antenna radiator 250 in the first direction (e.g., upward direction, Y-axis direction) or in the second direction (e.g., downward direction, negative Y-axis direction), a friction reduction member (not shown) may be disposed on a portion of the side of the first housing 220 in contact with the antenna radiator 250. For example, the friction reduction member is disposed between the antenna radiator 250 and the first housing 220, and friction caused by movement of the antenna radiator 250 in the first direction (e.g., upward direction, Y-axis direction) or in a second direction (e.g., downward direction, negative Y-axis direction) (e.g., up/down) may be reduced.

A guide rail (e.g., guide rail 280 in FIG. 7) may be disposed on an inner sidewall of one side (e.g., negative X-axis) of the first housing 220. The flexible printed circuit board (e.g., flexible printed circuit board 270 in FIG. 4) may be disposed to be fixed to the guide rail (e.g., guide rail 280 in FIG. 7).

According to an embodiment of the disclosure, the antenna radiator 250 and the flexible printed circuit board 270 may be electrically connected. According to sliding of the second housing (e.g., second housing 230 in FIGS. 3 and 4), the antenna radiator 250 and the flexible printed circuit board 270 may be moved in a first direction (e.g., upward direction, Y-axis direction) or a second direction (e.g., downward direction, negative Y-axis direction).

Figure 7:
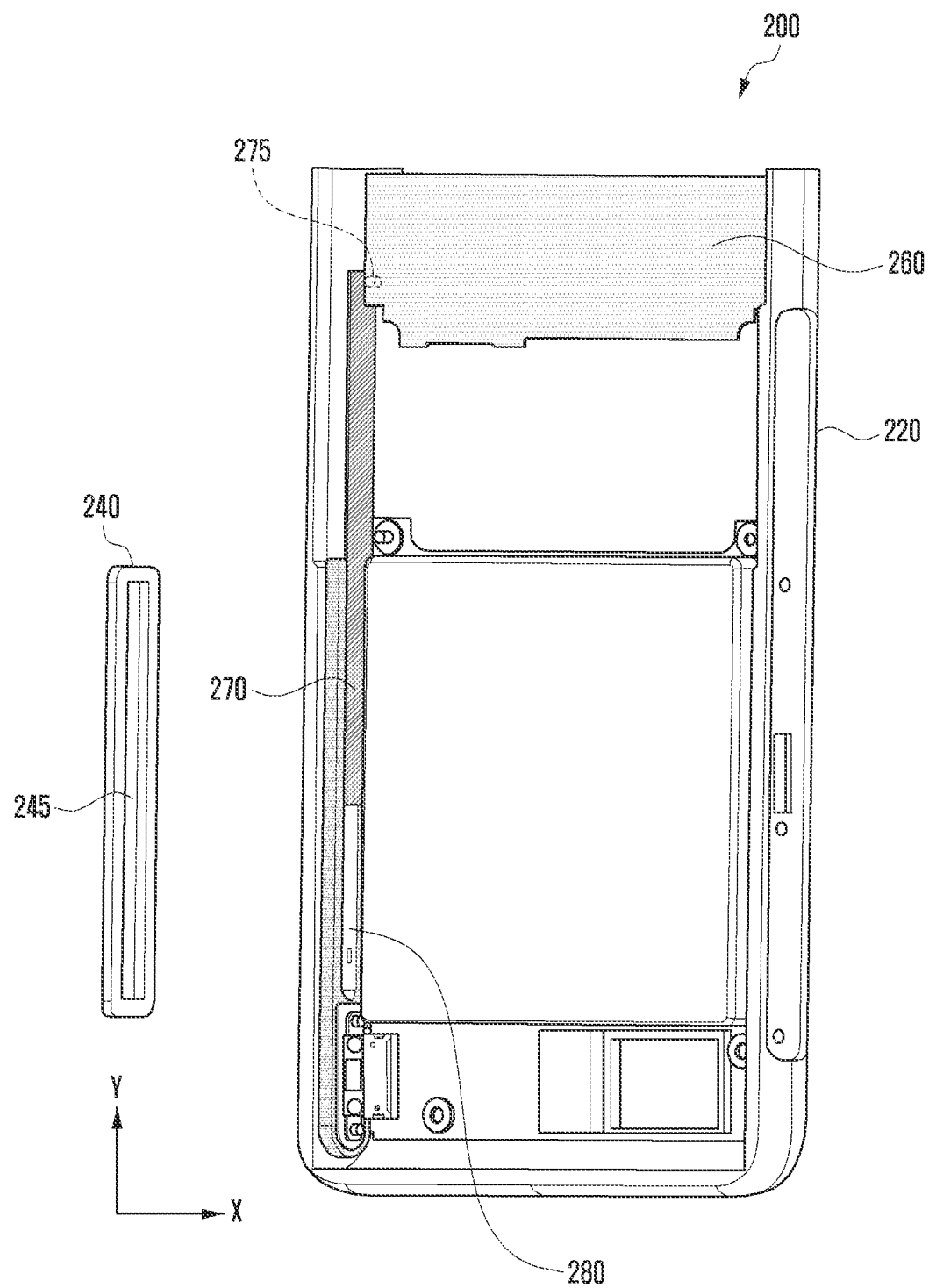
FIG. 7 is a view showing that a groove into which the antenna radiator can be inserted is formed in a decoration portion, according to an embodiment of the disclosure.

FIG. 7 is a view showing that a groove into which the antenna radiator can be inserted is formed in a decoration portion according to an embodiment of the disclosure.

Referring to FIG. 7, the decoration portion 240 may be disposed to cover the antenna radiator 250 at one side (e.g., negative X-axis) of the first housing 220. The shape of the decoration portion 240 may be formed to correspond to the shape of the recess (e.g., recess 222 in FIG. 6). For example, at least a part of the decoration portion 240 may be coupled to the recess 222. The groove 245 into which at least a portion of the antenna radiator 250 can be inserted is formed in the decoration portion 240. At least a portion of the antenna radiator 250 may be inserted into the groove 245 of the decoration portion 240, so that the antenna radiator 250 may be covered with the decoration portion 240. When the decoration portion 240 is fastened to the sidewall of the first housing 220, the antenna radiator 250 may be not exposed to the outside by the decoration portion 240. According to embodiment of the disclosure, the length of the groove 245 may be formed to correspond to the length that the antenna radiator 250 moves.

According to an embodiment of the disclosure, the decoration portion 240 may be made of a non-conductive material. As another example, when the decoration portion 240 is made of a conductive material, a non-conductive material may be disposed in the groove 245 to insulate the antenna radiator 250 from the decoration portion 240. The decoration portion 240 may be made of substantially the same material as the material of the sidewall of the first housing 220.

The flexible printed circuit board 270 may include a connector 275, and may be electrically connected to the printed circuit board 260 through the connector 275. When the second housing (e.g., second housing 230 in FIGS. 2 and 3) slides, the flexible printed circuit board (e.g., flexible printed circuit board 270 in FIG. 4) may move in an upward direction (e.g., Y-axis direction) or in a downward direction (e.g., negative Y-axis direction) along the guide rail (e.g., guide rail 280 in FIG. 7). For example, an antenna matching portion (not shown) may be disposed between the antenna radiator 250 and the flexible printed circuit board 270. As an example, the antenna matching portion may be disposed on the flexible printed circuit board 270.

According to an embodiment of the disclosure, a wireless communication circuit (e.g., wireless communication module 192 in FIG. 1) may be disposed on the printed circuit board 260. The wireless communication circuit may be electrically connected to the antenna radiator 250 by using the flexible printed circuit board 270. The wireless communication circuit may transmit and/or receive a signal of a designated frequency band by using the antenna radiator 250.

With the sliding of the second housing (e.g., second housing 230 in FIGS. 3 and 4), the flexible printed circuit board 270 and the printed circuit board 260 may move in a first direction (e.g., upward direction, Y-axis direction) or in a second direction (e.g., downward direction, negative Y-axis direction).

When the second housing (e.g., second housing 230 in FIGS. 2 and 3) slides in a first direction (e.g., Y-axis direction) in the slide-in (e.g., slide-close) state, the exposed size of the display (e.g., display 210 in FIGS. 2 and 3) of the electronic device 200 increases and the screen may be expanded accordingly. Along with this, the antenna radiator 250, the flexible printed circuit board 270, and the printed circuit board 260 may be moved together in the first direction (e.g., Y-axis direction).

When the second housing (e.g., second housing 230 in FIGS. 2 and 3) slides in a second direction (e.g., negative Y-axis direction) in the slide-out (e.g., slide-open) state, the exposed size of the display (e.g., display 210 in FIGS. 2 and 3) of the electronic device 200 decreases and the screen may be contracted accordingly. Along with this, the antenna radiator 250, the flexible printed circuit board 270, and the printed circuit board 260 may be moved together in the second direction (e.g., negative Y-axis direction).

As shown in FIG. 4, when the electronic device 200 is in the slide-in (e.g., slide-close) state, the antenna radiator 250 may be located at a lower position (e.g., low in negative y-axis) inside the through hole 225 of the first housing 220.

As shown in FIG. 5, when the electronic device 200 is in the slide-out (e.g., slide-open) state, the antenna radiator 250 may be located at an upper position (e.g., high in Y-axis) inside the through hole 225 of the first housing 220. For example, the antenna radiator 250 may be located higher in the positive Y-axis direction (e.g., upward) when the electronic device 200 is in the slide-out (e.g., slide-open) state compared to when the electronic device 200 is in the slide-in (e.g., slide-close) state.

Figure 8:
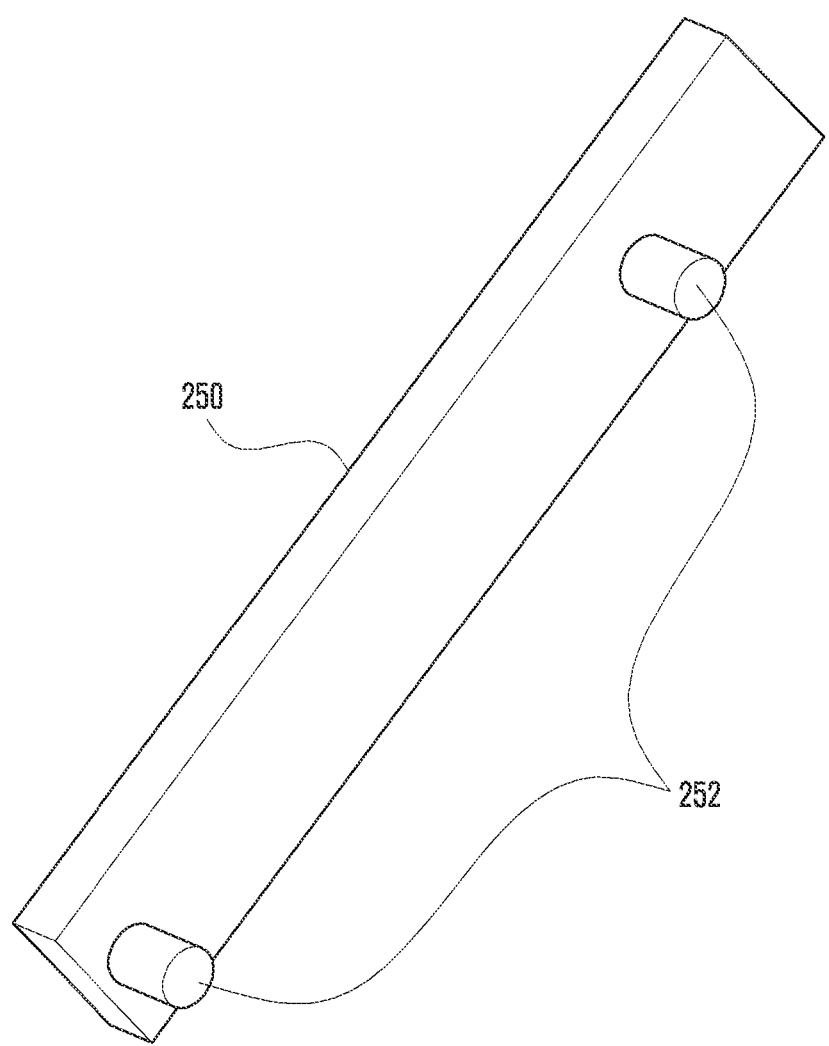
FIG. 8 is a view showing an antenna radiator according to an embodiment of the disclosure.

FIG. 8 is a view showing the antenna radiator according to an embodiment of the disclosure.

Referring to FIG. 8, the antenna radiator 250 may be formed in the form of a metal bar, and may include a plurality of contact portions 252 for electrically connecting to the flexible printed circuit board (e.g., flexible printed circuit board 270 in FIG. 9). As another example, the antenna radiator 250 may include one or more contact portions 252 for electrically connecting to the flexible printed circuit board 270.

According to an embodiment of the disclosure, the antenna radiator 250 may include an antenna radiator for cellular communication or short-range communication (e.g., Wi-Fi). The antenna radiator 250 may be included in an antenna for wireless communication with a designated first frequency, second frequency, or third frequency. The shape of the antenna radiator 250 is not limited to that of FIG. 8. The shape of the antenna radiator 250, such as the length, width, or thickness, may be formed differently depending on the frequency band to be operated.

The first frequency may be a communication frequency of the sub-6 (6 GHz or less) band for 5G communication. The first frequency may further include a communication frequency for second generation (2G), 3G, or 4G or long term evolution (LTE) network.

The second frequency may be a communication frequency of an extremely high frequency band (e.g., mmWave (e.g., 28 GHz or 39 GHz)) for 5G communication. In one embodiment, an antenna module (not shown) may be disposed instead of the antenna radiator 250. For example, the antenna module may include a printed circuit board, an array antenna including at least two antennas, or an RFIC. The antenna module may transmit and/or receive a signal of the mmWave band.

The third frequency may be a communication frequency for Bluetooth or Wi-Fi communication in the ISM band of 2.4 GHz or 5 GHz.

Figure 9A:
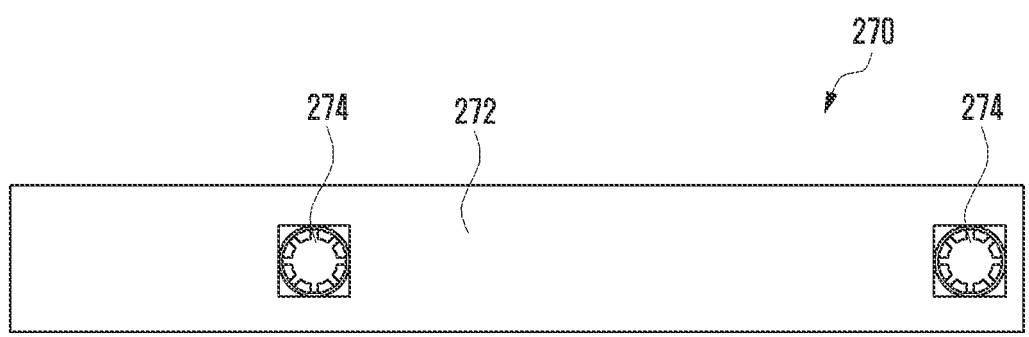
FIGS. 9A and 9B are views showing a flexible printed circuit board according to an embodiment of the disclosure.
Figure 9B:
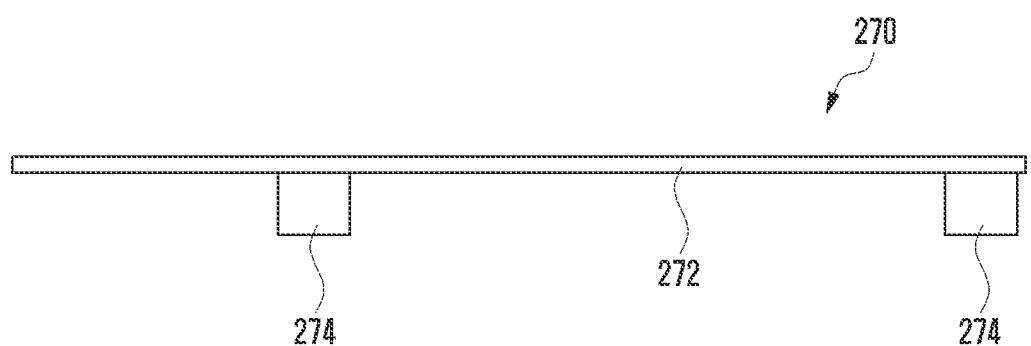
Figure 10:
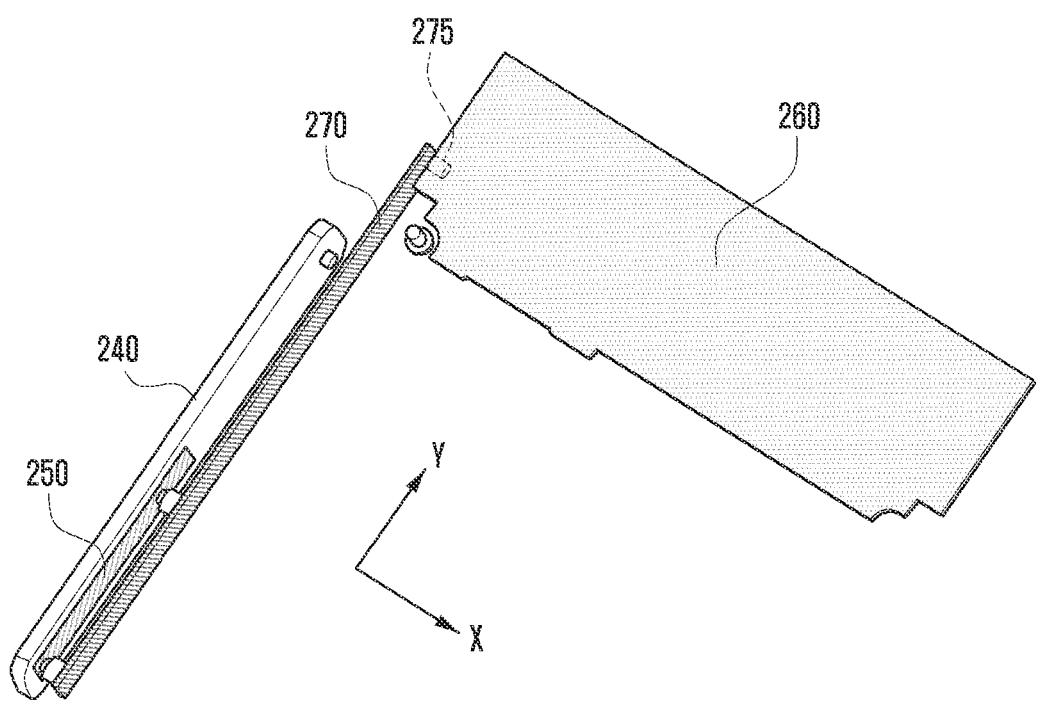
FIG. 10 is a view showing that the antenna radiator is electrically connected to the flexible printed circuit board (FPCB), according to an embodiment of the disclosure.
Figure 11:
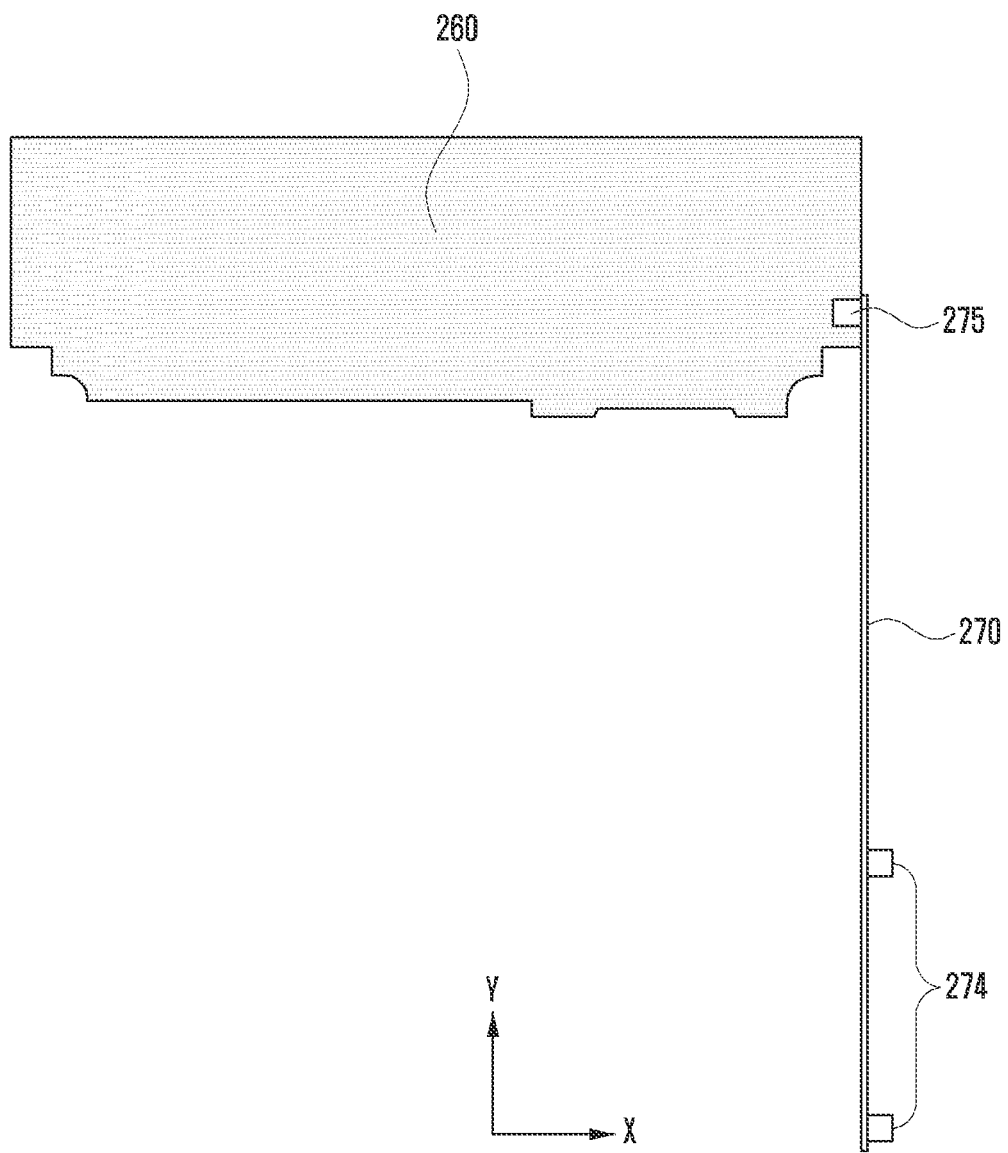
FIG. 11 is a view showing that the flexible printed circuit board (FPCB) and a printed circuit board (PCB) are electrically connected, according to an embodiment of the disclosure.

FIGS. 9A and 9B are views showing the flexible printed circuit board (FPCB) according to an embodiment of the disclosure. FIG. 10 is a view showing that the antenna radiator is electrically connected to the flexible printed circuit board (FPCB) according to an embodiment of the disclosure. FIG. 11 is a view showing that the flexible printed circuit board (FPCB) and the printed circuit board (PCB) are electrically connected according to an embodiment of the disclosure.

Referring to FIGS. 9A, 9B, 10, and 11, the first housing (e.g., first housing 220 in FIG. 7) and the guide rail (e.g., guide rail 280 in FIG. 7) are not shown.

The flexible printed circuit board 270 may include a substrate body 272 on which a plurality of wires are formed, a plurality of contact grooves 274, and/or a connector 275.

According to an embodiment of the disclosure, the plural contact grooves 274 may be formed in a cylindrical shape having a groove formed therein. The plural contact portions 252 of the antenna radiator 250 may be inserted into the plural contact grooves 274 of the flexible printed circuit board 270 to thereby electrically connect the antenna radiator 250 and the flexible printed circuit board 270. For example, the shapes of the contact groove 274 and the contact portion 252 may be formed to correspond to each other. For instance, when the contact portion 252 is formed in a rectangular pillar shape, the contact groove 274 may also be formed in a rectangular shape capable of accommodating the rectangular pillar. As another example, although a plurality of contact grooves 274 are indicated in FIG. 9, without being limited thereto, there may be more than one contact groove 274.

The connector 275 may be formed at one end of the flexible printed circuit board 270. The connector 275 may be connected to the printed circuit board 260 with B to B contacts, so that the printed circuit board 260 and the flexible printed circuit board 270 can be electrically connected to each other. A wireless communication circuit (e.g., antenna module 197 in FIG. 1) may be disposed on the printed circuit board 260 to radiate an RF signal through the antenna radiator 250 and process an RF signal received through the antenna radiator 250.

According to an embodiment of the disclosure, when an antenna module is disposed instead of the antenna radiator 250, a connector (e.g., connector 275 in FIG. 7) may be included at the other end of the flexible printed circuit board 270 instead of the contact groove 274. For example, if the antenna module may include a connector, it may be electrically connected to the flexible printed circuit board 270 by using the connector.

Figure 12:
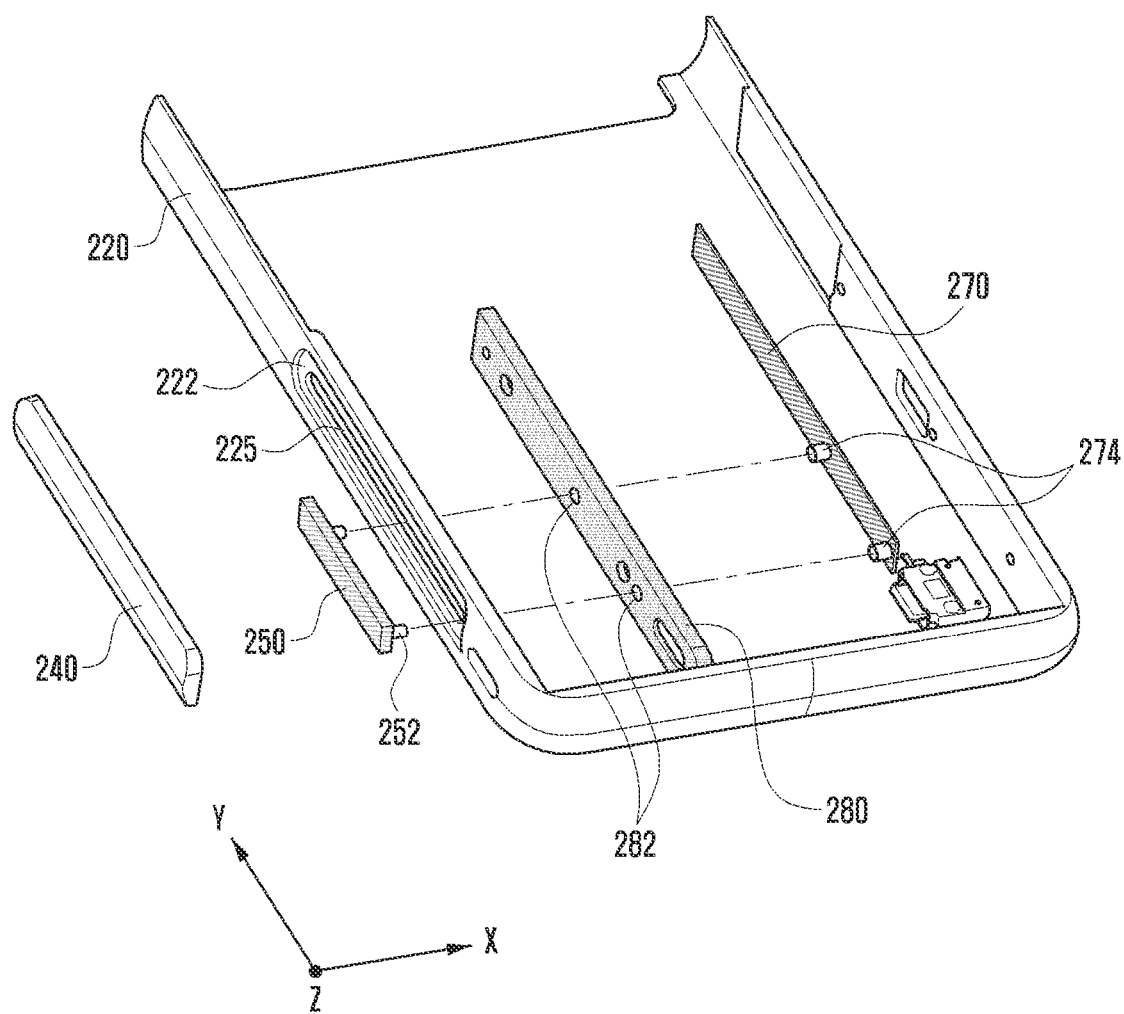
FIG. 12 is a view showing a structure in which the antenna radiator is disposed in the housing and a structure in which the antenna radiator and the flexible printed circuit board (FPCB) are electrically connected, according to an embodiment of the disclosure.
Figure 13:
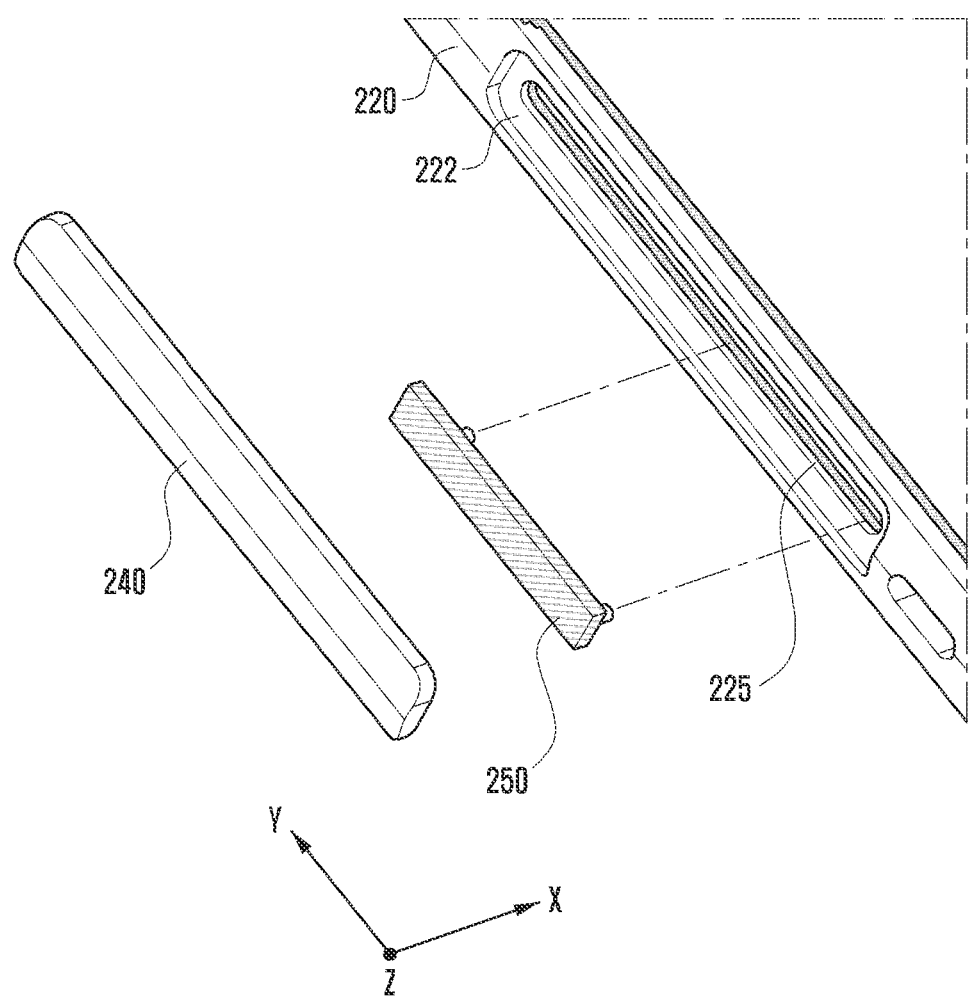
FIG. 13 is a view showing that the antenna radiator is disposed on the outer side surface of the housing so as to be movable up and down, according to an embodiment of the disclosure.

FIG. 12 is a view showing a structure in which the antenna radiator is disposed in the housing and a structure in which the antenna radiator and the flexible printed circuit board (FPCB) are electrically connected according to an embodiment of the disclosure. FIG. 13 is a view showing that the antenna radiator is disposed on the outer side surface of the housing so as to be movable up and down according to an embodiment of the disclosure.

Referring to FIGS. 12 and 13, the recess 222 and the through hole 225 are formed in the outer sidewall of one side of the first housing 220, the antenna radiator 250 is disposed in the recess 222, and at least some of the antenna radiator 250 may be inserted into the through hole 225. The decoration portion 240 is disposed to cover the antenna radiator 250 and the through hole 255, so that the antenna radiator 250 and the through hole 255 may be not exposed to the outside due to the decoration portion 240.

According to an embodiment of the disclosure, a plurality of through holes 282 may be formed in the guide rail 280 so that the plural contact portions 252 of the antenna radiator 250 may pass therethrough. The plural contact portions 252 of the antenna radiator 250 may pass through the through holes 282 and be inserted into the contact grooves 274 of the flexible printed circuit board 270.

Figure 14:
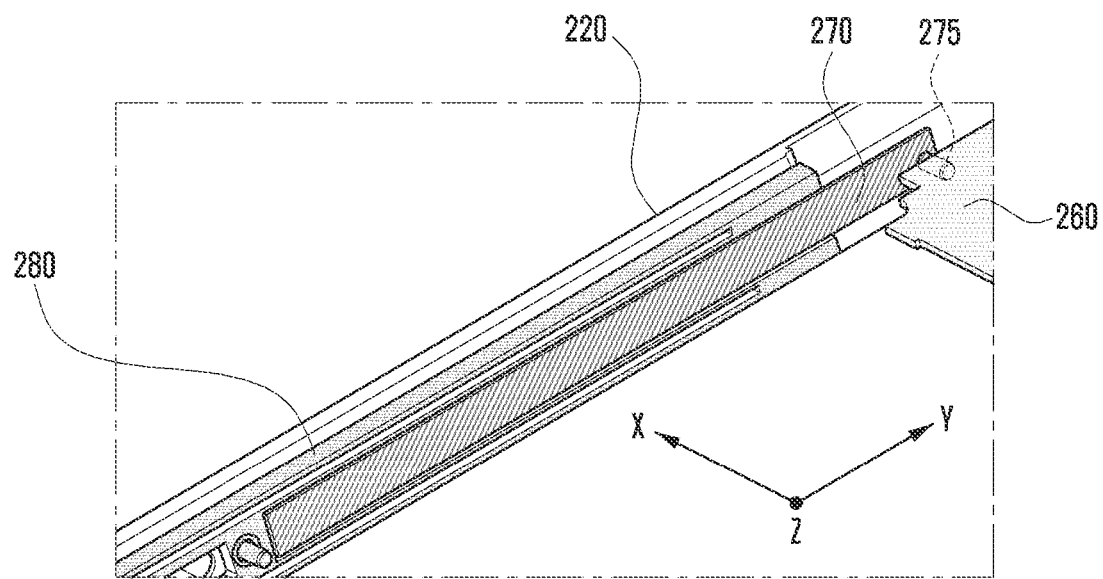
FIG. 14 is a view showing that the flexible printed circuit board (FPCB) is disposed on a guide rail so that the flexible printed circuit board (FPCB) can move according to the movement of the antenna radiator, according to an embodiment of the disclosure.

FIG. 14 is a view showing that the flexible printed circuit board (FPCB) is disposed on the guide rail so that the flexible printed circuit board (FPCB) can move according to the movement of the antenna radiator according to an embodiment of the disclosure.

Referring to FIGS. 12 to 14, a guide groove into which the flexible printed circuit board 270 can be inserted is formed in the guide rail 280. Through this, the antenna radiator 250 disposed outside the first housing 220 may be electrically connected to the flexible printed circuit board 270. The flexible printed circuit board 270 is electrically connected to the printed circuit board (e.g., printed circuit board 260 in FIGS. 10 and 11), so that the antenna radiator 250 may be electrically connected to the printed circuit board 260.

According to an embodiment of the disclosure, at least a portion of the flexible printed circuit board 270 is inserted into the guide groove of the guide rail 280, and the flexible printed circuit board 270 and the guide rail 280 may be moved in a first direction (e.g., Y-axis direction) or in a second direction (e.g., negative Y-axis direction). The antenna radiator 250, the guide rail 280, and the flexible printed circuit board 270 may move according to movement of the second housing (e.g., second housing 230 in FIGS. 2 and 3).

The guide rail 280 may be connected to the second housing 230. As a result, when the second housing 230 is moved, the guide rail 280 may be moved and the antenna radiator 250 and the flexible printed circuit board 270 arranged on the guide rail 280 may be moved along the guide rail 280.

The first housing 220 may include a groove (not shown) in which the guide rail 280 can be disposed so that the guide rail 280 may move according to the movement of the second housing 230. This groove may guide the guide rail 280 to move in a specified direction (e.g., Y-axis direction).

A connection member capable of transmitting an RF signal such as a coaxial cable may be disposed in place of the flexible printed circuit board 270.

Hereinabove, a description has been given of embodiments in which the antenna radiator 250 is disposed on an outer sidewall of the first housing 220 of the electronic device 200 including a flexible display, and in case of screen contraction or screen expansion of the electronic device 200, the antenna radiator 250, the guide rail 280, and the flexible printed circuit board 270 are moved upward in the Y-axis direction or moved downward in the negative Y-axis direction.

Without being limited to this, in a bar-type electronic device including a flat panel display, an antenna radiator may be disposed on an outer sidewall of the housing, a slit may be formed in the outer sidewall of the housing, and a flexible printed circuit board connected to the antenna radiator may be disposed inside the housing. For example, the antenna radiator may be disposed outside the housing of the electronic device, and a connector of the antenna radiator may be inserted into the housing to be electrically connected to the flexible printed circuit board.

Figure 15:
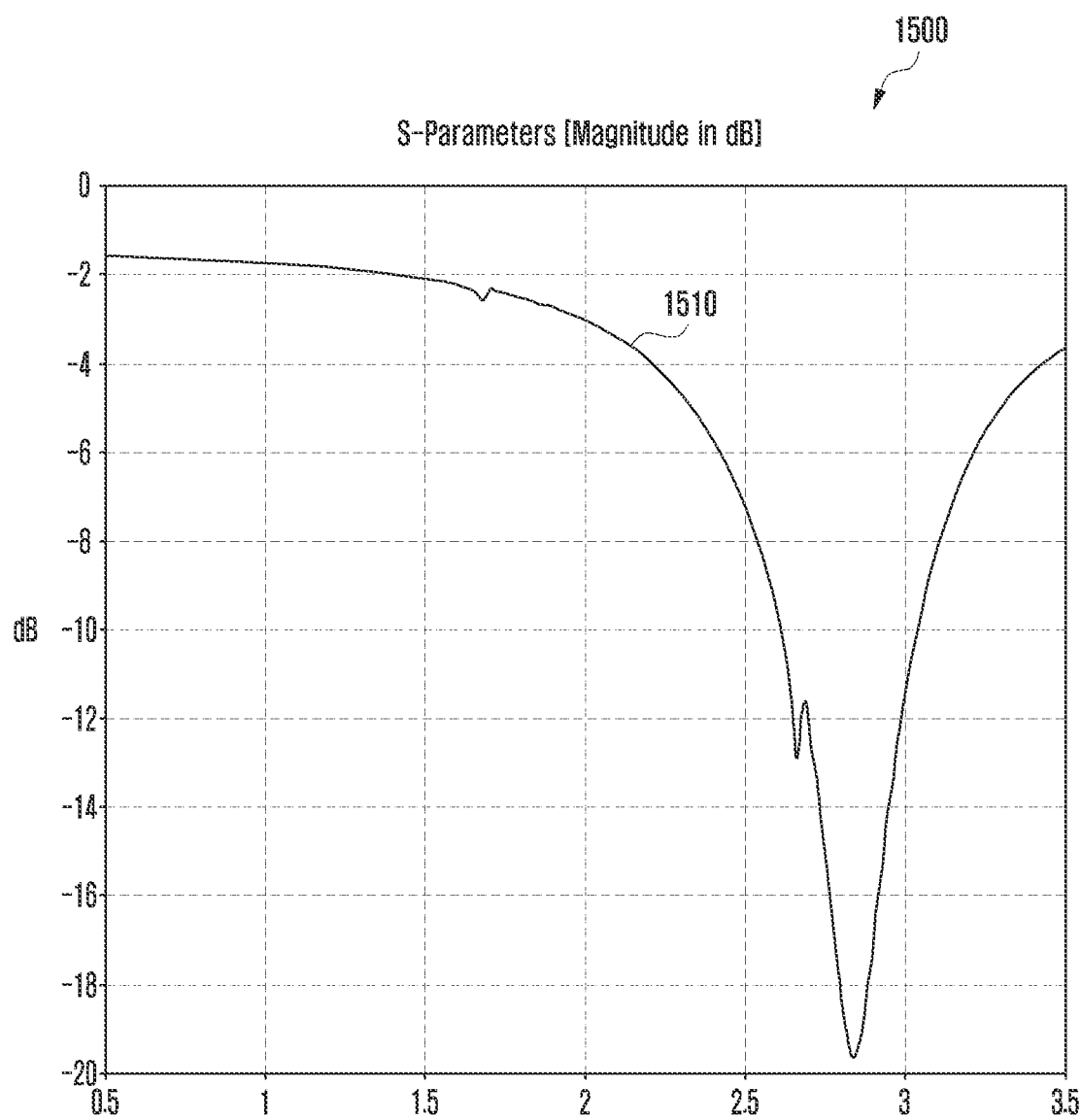
FIG. 15 is a diagram showing an S-parameter value of the antenna when the electronic device is in a slide-in (e.g., slide-close) state according to an embodiment of the disclosure.
Figure 16:
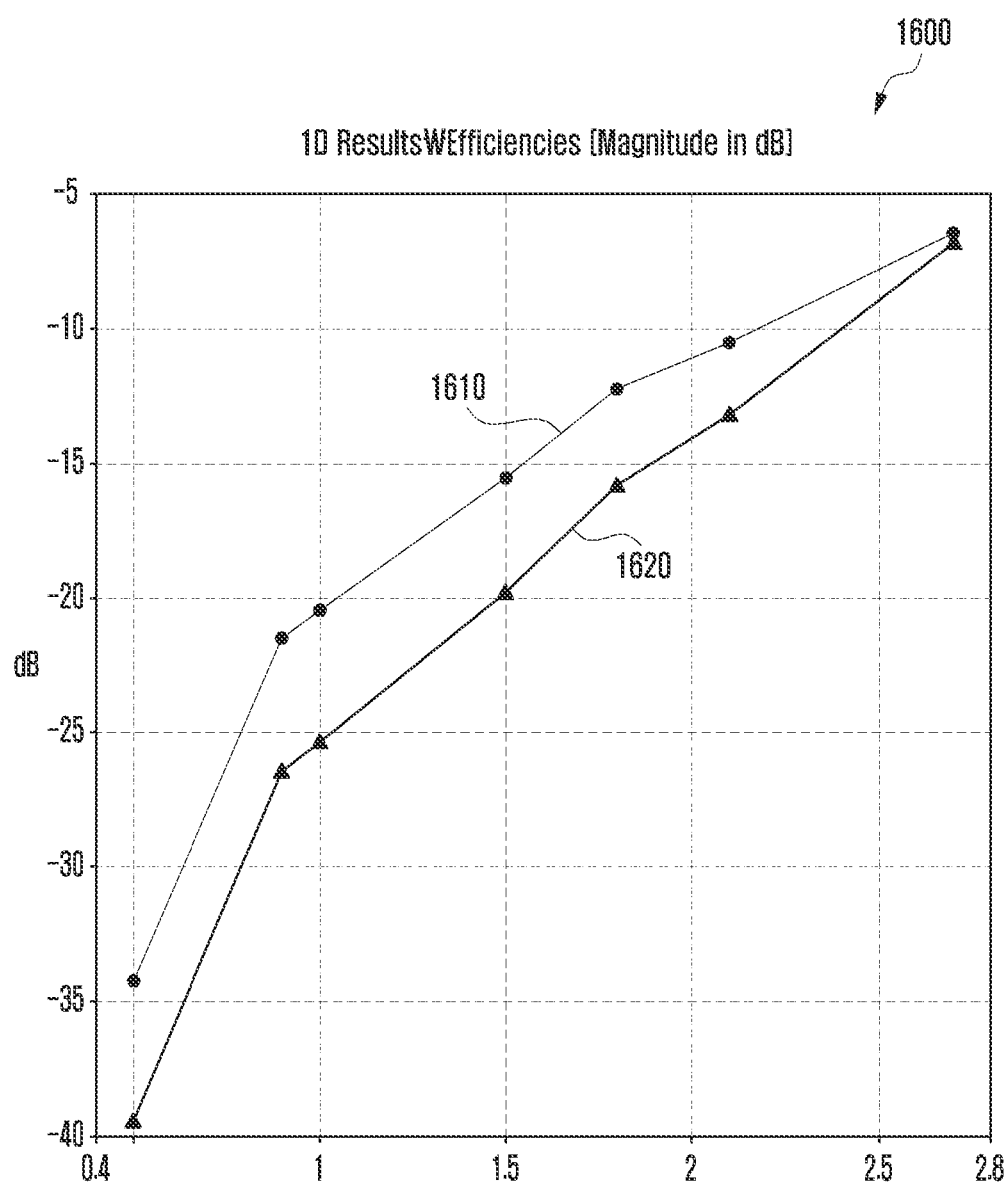
FIG. 16 is a diagram illustrating radiation efficiency of the antenna when the electronic device is in a slide-in (e.g., slide-close) state according to an embodiment of the disclosure.

FIG. 15 is a diagram 1500 showing an S-parameter value 1510 of the antenna when the electronic device is in a slide-in (e.g., slide-close) state according to an embodiment of the disclosure. FIG. 16 is a diagram 1600 illustrating radiation efficiency of the antenna when the electronic device is in a slide-in (e.g., slide-close) state according to an embodiment of the disclosure.

Referring to FIGS. 15 and 16, the X-axis represents the frequency, and the Y-axis represents an S-parameter. Radiation efficiency 1610 may indicate the overall efficiency of the antenna of the electronic device in a slide-in (e.g., slide-close) state. Total efficiency 1620, as radiation efficiency (1610)*S11 (matching characteristic), may represent the efficiency excluding the input loss of the antenna of the electronic device in the slide-in (e.g., slide-close) state.

It can be seen that radiation efficiencies 1610 and 1620 of the antenna (e.g., antenna radiator 250 in FIGS. 4 and 5) are excellent because the S-parameter value 1510 becomes −7 to −19.5 dB in the range of 2.5 GHz to 3 GHz when the electronic device 200 is in the slide-in (e.g., slide-close) state.

Figure 17:
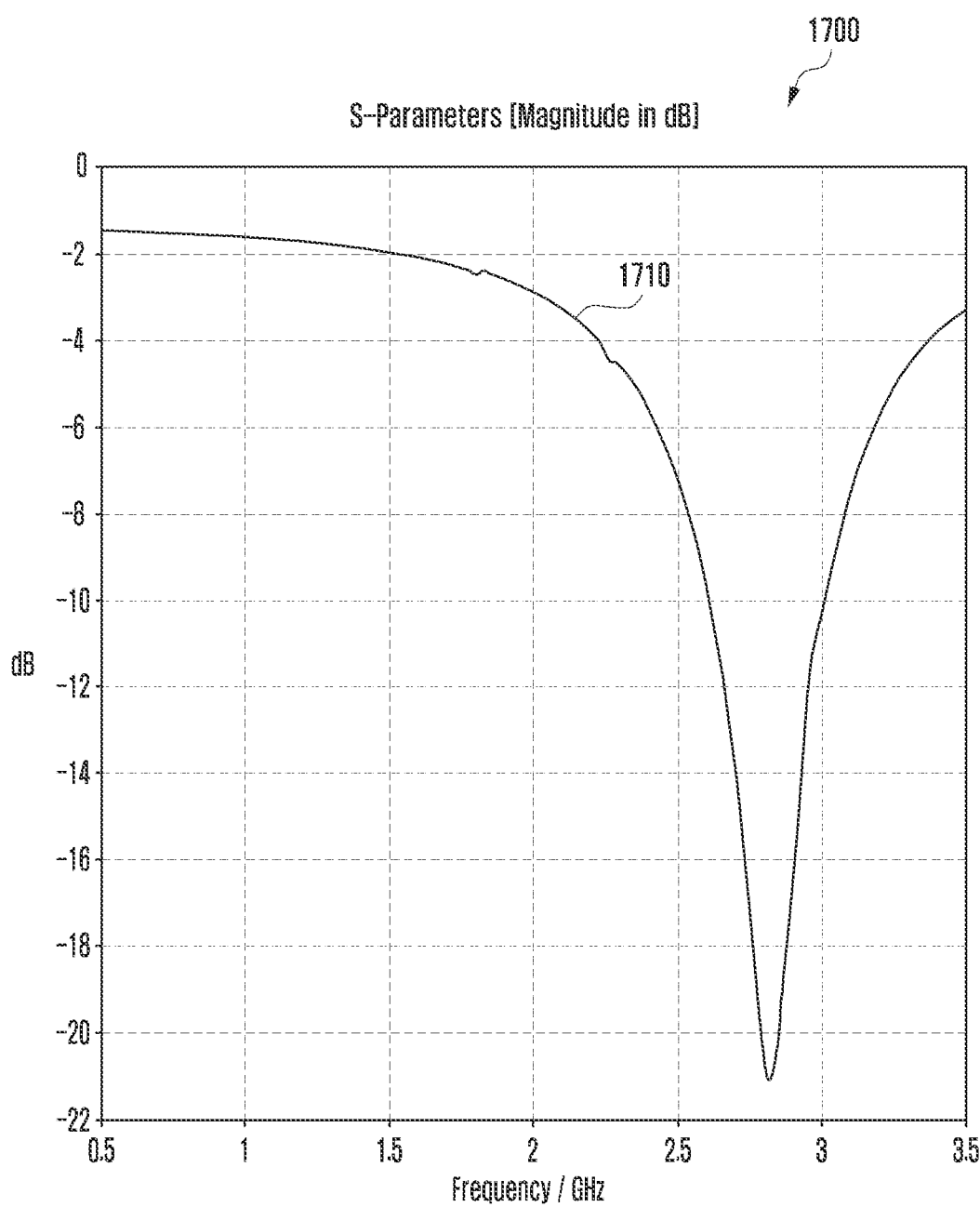
FIG. 17 is a diagram showing an S-parameter value of the antenna when the electronic device is in a slide-out (e.g., slide-open) state, according to an embodiment of the disclosure.
Figure 18:
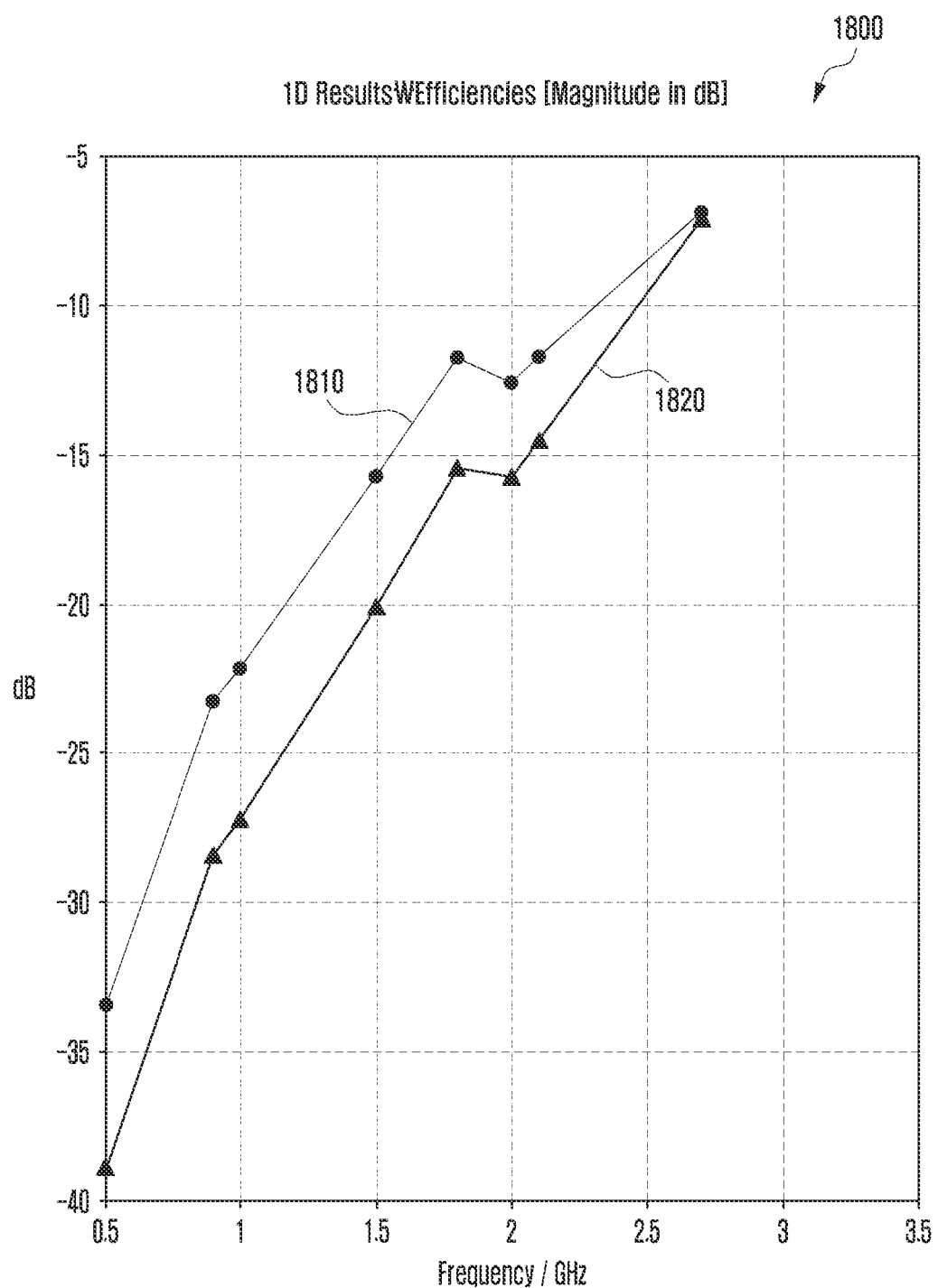
FIG. 18 is a diagram illustrating radiation efficiency of the antenna when the electronic device is in a slide-out (e.g., slide-open) state, according to an embodiment of the disclosure.

FIG. 17 is a diagram 1700 showing an S-parameter value of the antenna when the electronic device is in a screen slide-out (e.g., slide-open) state according to an embodiment of the disclosure. FIG. 18 is a diagram 1800 illustrating radiation efficiencies 1810 and 1820 of the antenna when the electronic device is in the screen slide-out (e.g., slide-open) state according to an embodiment of the disclosure.

Referring to FIGS. 17 and 18, the X-axis represents the frequency, and the Y-axis represents an S-parameter. Radiation efficiency 1610 may indicate the overall efficiency of the antenna of the electronic device in a slide-out (e.g., slide-open) state. Total efficiency 1620, as radiation efficiency (1610)*S11 (matching characteristic), may represent the efficiency excluding the input loss of the antenna of the electronic device in the slide-out (e.g., slide-open) state.

It can be seen that radiation efficiencies 1810 and 1820 of the antenna (e.g., antenna radiator 250 in FIGS. 4 and 5) are excellent because the S-parameter value 1710 becomes −7 to −21 dB in the range of 2.5 GHz to 3 GHz when the electronic device 200 is in screen expansion (e.g., slide-open).

Referring to FIGS. 14 to 18, it can be seen that the radiation efficiency of the antenna (e.g., antenna radiator 250 in FIGS. 4 and 5) is excellent regardless of slide-in (e.g., slide-close) or screen expansion (e.g., slide-open) of the electronic device 200.

In the electronic device 200 according to an embodiment of the disclosure, the antenna radiator 250 and the flexible printed circuit board 270 are moved together with the sliding of the housing in case of screen expansion or screen contraction, which can reduce loss due to an increase in the length of a conductive connection member of the flexible printed circuit board 270 to thereby improve the radiation performance of the antenna radiator 250.

In the electronic device 200 according to an embodiment of the disclosure, when the mounting space of the antenna radiator 250 is insufficient due to the form factor, the antenna radiator 250 may be disposed on the outer sidewall of the housings 220 and 230 and the antenna radiator 250 may be covered with the decoration portion 240, thereby preventing the antenna radiator 250 from being exposed to the outside. In addition, through holes 225 may be formed in one sidewall of the first housing 220 and plural contact portions 252 of the antenna radiator 250 may penetrate the through holes 225 and be electrically connected to the flexible printed circuit board 270 arranged inside the first housing 220. Thereby, the antenna may be disposed outside the housings 220 and 230 of the electronic device 200, so that the space constraint due to the form factor of the electronic device 200 can be overcome, and the degree of freedom in design of the electronic device 200 can be secured.

The electronic device (e.g., electronic device 200 in FIGS. 2 to 5) according to an embodiment of the disclosure may include a first housing (e.g., first housing 220 in FIGS. 2 and 3), a second housing (e.g., second housing 230 in FIGS. 2 and 3), a flexible display (e.g., display 210 in FIGS. 2 and 3), a printed circuit board (e.g., printed circuit board 260 in FIGS. 2 and 3), an antenna radiator (e.g., antenna radiator 250 in FIGS. 4 and 5), and a flexible printed circuit board (e.g., flexible printed circuit board 270 in FIG. 4). The second housing (e.g., second housing 230 in FIGS. 2 and 3) may be slid in a first direction to be pulled out of the first housing (e.g., first housing 220 in FIGS. 2 and 3) and may be slid in a second direction opposite to the first direction to be pulled into the inside of the first housing (e.g., first housing 220 in FIGS. 2 and 3). The flexible display (e.g., display 210 in FIGS. 2 and 3) may be disposed in the first housing (e.g., first housing 220 in FIGS. 2 and 3) and the second housing (e.g., second housing 230 in FIGS. 2 and 3). The printed circuit board (e.g., printed circuit board 260 in FIGS. 2 and 3) may be disposed in the second housing (e.g., second housing 230 in FIGS. 2 and 3) and may be moved according to the sliding of the second housing (e.g., second housing 230 in FIGS. 2 and 3). The antenna radiator (e.g., antenna radiator 250 in FIGS. 4 and 5) may be disposed on a side surface of the first housing (e.g., first housing 220 in FIGS. 2 and 3). The flexible printed circuit board (e.g., flexible printed circuit board 270 in FIG. 4) may electrically connect the printed circuit board (e.g., printed circuit board 260 in FIGS. 2 and 3) and the antenna radiator (e.g., antenna radiator 250 in FIGS. 4 and 5). The first housing (e.g., first housing 220 in FIGS. 2 and 3) may include a through hole (e.g., through hole 225 in FIG. 6) formed in a side surface thereof, and at least some of the antenna radiator (e.g., antenna radiator 250 in FIGS. 4 and 5) may be inserted via the through hole (e.g., through hole 225 in FIG. 6) into the inside of the first housing (e.g., first housing 220 in FIGS. 2 and 3). According to the sliding of the second housing (e.g., second housing 230 in FIGS. 2 and 3), the antenna radiator (e.g., antenna radiator 250 in FIGS. 4 and 5) may be moved on a side surface of the first housing (e.g., first housing 220 in FIGS. 2 and 3).

According to an embodiment of the disclosure, the printed circuit board (e.g., printed circuit board 260 in FIGS. 2 and 3) may be moved in the first direction or in the second direction according to the sliding of the second housing (e.g., second housing 230 in FIGS. 2 and 3).

According to an embodiment of the disclosure, the antenna radiator may be moved in the first direction or in the second direction inside the through hole (e.g., through hole 225 in FIG. 6) of the first housing (e.g., first housing 220 in FIGS. 2 and 3) according to the sliding of the second housing (e.g., second housing 230 in FIGS. 2 and 3).

According to an embodiment of the disclosure, the flexible printed circuit board (e.g., flexible printed circuit board 270 in FIG. 4) may be moved in the first direction or in the second direction inside the first housing (e.g., first housing 220 in FIGS. 2 and 3) according to the sliding of the second housing (e.g., second housing 230 in FIGS. 2 and 3).

According to an embodiment of the disclosure, the electronic device may include a guide rail (e.g., guide rail 280 in FIG. 7) that is disposed on an inner side surface of the first housing (e.g., first housing 220 in FIGS. 2 and 3) and includes a guide groove into which the flexible printed circuit board (e.g., flexible printed circuit board 270 in FIG. 4) is inserted.

According to an embodiment of the disclosure, the flexible printed circuit board (e.g., flexible printed circuit board 270 in FIG. 4) may be inserted into the guide groove to be moved in the first direction or the second direction.

According to an embodiment of the disclosure, contact portions (e.g., contact portions 252 in FIG. 9) of the antenna radiator may be electrically connected to the flexible printed circuit board (e.g., flexible printed circuit board 270 in FIG. 4).

According to an embodiment, the guide rail (e.g., guide rail 280 in FIG. 7) may include a plurality of through holes (e.g., through holes 225 in FIG. 6) that are penetrated by the plurality of contact portions (e.g., contact portions 252 in FIG. 9) of the antenna radiator.

According to an embodiment, the flexible printed circuit board (e.g., flexible printed circuit board 270 in FIG. 4) may include a plurality of contact grooves (e.g., contact grooves 274 in FIGS. 9, 11 and 12) into which the plural contact portions (e.g., contact portions 252 in FIG. 9) of the antenna radiator are inserted.

According to an embodiment, a connector (e.g., connector 275 in FIG. 11), which is electrically connected to the printed circuit board, may be formed at one end of the flexible printed circuit board (e.g., flexible printed circuit board 270 in FIG. 4).

According to an embodiment, the electronic device may include a decoration portion (e.g., decoration portion 240 in FIGS. 12 and 13) disposed on an outer side surface of the first housing (e.g., first housing 220 in FIGS. 2 and 3) to cover the antenna radiator.

According to an embodiment, the decoration portion (e.g., decoration portion 240 in FIGS. 12 and 13) may be disposed to cover the through hole (e.g., through hole 225 in FIG. 6).

According to an embodiment, the decoration portion (e.g., decoration portion 240 in FIGS. 12 and 13) may include a groove (e.g., groove 245 in FIG. 7) into which at least some of the antenna radiator is inserted.

According to an embodiment, the electronic device may include a recess (e.g., recess 222 in FIGS. 4, 6 and 12) that is formed to have a specific depth on one sidewall of the first housing (e.g., first housing 220 in FIGS. 2 and 3).

According to an embodiment, the antenna radiator (e.g., antenna radiator 250 in FIGS. 4 and 5) may be disposed in the recess (e.g., recess 222 in FIGS. 4, 6 and 12).

According to an embodiment, the decoration portion (e.g., decoration portion 240 in FIGS. 12 and 13) may be disposed to cover the recess (e.g., recess 222 in FIGS. 4, 6 and 12).

According to an embodiment, the through hole (e.g., through hole 225 in FIG. 6) may be formed in the shape of a bar having a long length in the first direction and in the second direction.

According to an embodiment, the printed circuit board (e.g., printed circuit board 260 in FIGS. 2 and 3) may include an antenna driving module.

According to an embodiment, the electronic device may include a friction reduction member disposed between the antenna radiator and the outer side surface of the first housing (e.g., first housing 220 in FIGS. 2 and 3).

According to an embodiment, the electronic device may include an antenna matching portion disposed between the antenna radiator and the flexible printed circuit board (e.g., flexible printed circuit board 270 in FIG. 4).

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a first housing;
a second housing that slides in a first direction to be pulled out of the first housing and slides in a second direction opposite to the first direction to be pulled into an inside of the first housing;
a flexible display disposed in the first housing and the second housing;
a printed circuit board that is disposed in the second housing and moves according to the sliding of the second housing;
an antenna radiator disposed on a side surface of the first housing; and
a flexible printed circuit board electrically connecting the printed circuit board and the antenna radiator,
wherein the first housing includes a through hole formed in the side surface thereof, and at least a portion of the antenna radiator is inserted via the through hole into the inside of the first housing, and
wherein the antenna radiator moves on the side surface of the first housing according to the sliding of the second housing.

2. The electronic device of claim 1, wherein the printed circuit board moves in the first direction or in the second direction according to the sliding of the second housing.

3. The electronic device of claim 1, wherein the antenna radiator moves in the first direction or in the second direction inside the through hole of the first housing according to the sliding of the second housing.

4. The electronic device of claim 1, wherein the flexible printed circuit board moves in the first direction or in the second direction inside the first housing according to the sliding of the second housing.

5. The electronic device of claim 1, further comprising a guide rail that is disposed on an inner side surface of the first housing and includes a guide groove into which the flexible printed circuit board is inserted.

6. The electronic device of claim 5, wherein the flexible printed circuit board is inserted into the guide groove so as to move in the first direction or in the second direction.

7. The electronic device of claim 6, wherein contact portions of the antenna radiator are electrically connected to the flexible printed circuit board.

8. The electronic device of claim 7, wherein the guide rail further includes a plurality of through holes that are penetrated by the plural contact portions of the antenna radiator.

9. The electronic device of claim 8, wherein the flexible printed circuit board includes a plurality of contact grooves into which the plural contact portions of the antenna radiator are inserted.

10. The electronic device of claim 8, further comprising a connector electrically connected to the printed circuit board and formed at one end of the flexible printed circuit board.

11. The electronic device of claim 1, further comprising a decoration portion that is disposed on an outer side surface of the first housing to cover the antenna radiator.

12. The electronic device of claim 11, wherein the decoration portion is disposed to cover the through hole.

13. The electronic device of claim 11, wherein the decoration portion includes a groove into which at least a portion of the antenna radiator is inserted.

14. The electronic device of claim 11, further comprising a recess that is formed to have a specific depth on one sidewall of the first housing.

15. The electronic device of claim 14, wherein the antenna radiator is disposed in the recess.

16. The electronic device of claim 15, wherein the decoration portion is disposed to cover the recess.

17. The electronic device of claim 1, wherein the through hole is formed in a shape of a bar having a long length in the first direction and in the second direction.

18. The electronic device of claim 1, wherein the printed circuit board includes an antenna driving module.

19. The electronic device of claim 1, further comprising a friction reduction member disposed between the antenna radiator and an outer side surface of the first housing.

20. The electronic device of claim 1, further comprising an antenna matching portion disposed between the antenna radiator and the flexible printed circuit board.

* * * * *